Nov. 10, 1925.
G. B. SPRING
1,561,193
REENFORCEMENT FOR POLES
Filed June 5, 1925
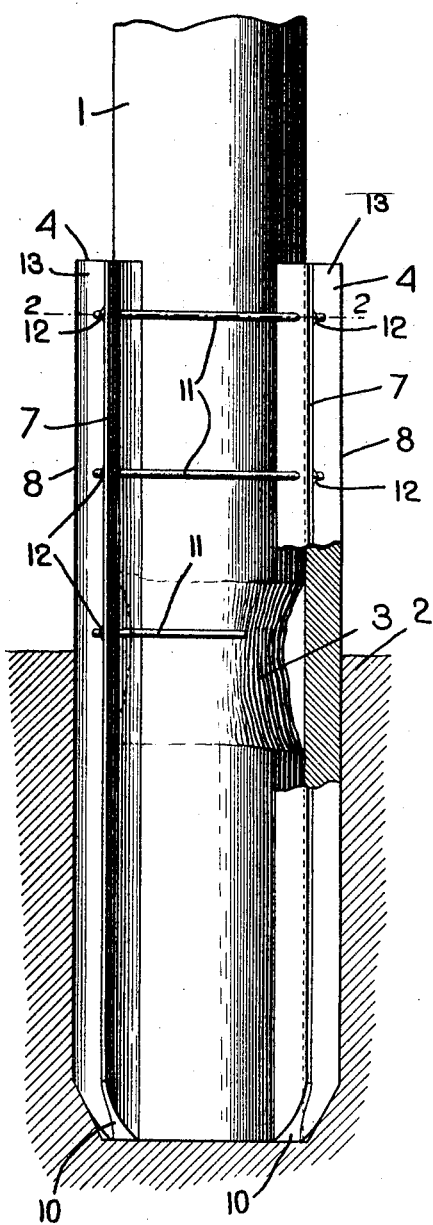
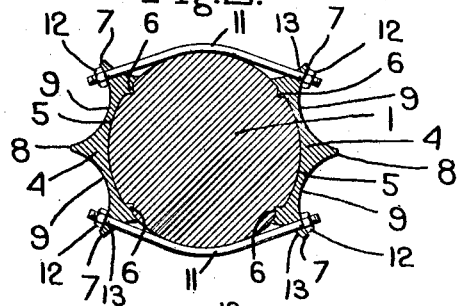
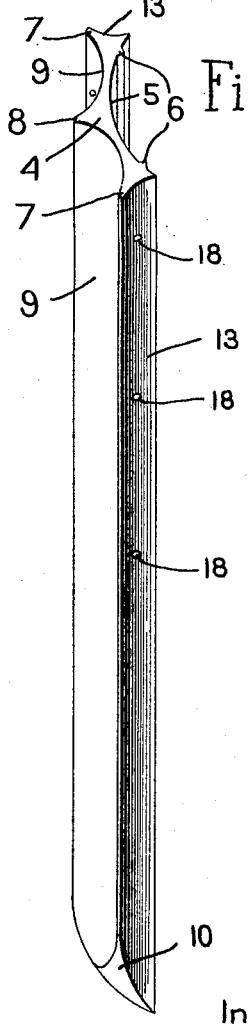
Inventor.
George B. Spring
by Heard Smith & Tennant.
Attys.

Patented Nov. 10, 1925.

1,561,193

UNITED STATES PATENT OFFICE.

GEORGE B. SPRING, OF NEWTON HIGHLANDS, MASSACHUSETTS.

REENFORCEMENT FOR POLES.

Application filed June 5, 1925. Serial No. 35,054.

*To all whom it may concern:*

Be it known I, GEORGE B. SPRING, a citizen of the United States, and resident of Newton Highlands, county of Middlesex, State of Massachusetts, have invented an Improvement in Reenforcement for Poles, of which the following description, in connection with the accompanying drawing, is a specification, like characters on the drawing representing like parts.

This invention relates to a means for reenforcing telephone poles, telegraph poles and other similar poles.

A wooden pole of this nature usually first shows weakness at the surface of the earth, this weakness being caused by the decay occasioned by the changes in the degrees of moisture to which the pole is subjected at this point.

It is an object of my present invention to provide an improved reenforcement for wooden poles which can be applied to the pole when it shows signs of weakness at the surface of the earth and by means of which the life of the pole can be materially lengthened.

My improved reenforcement can also be applied to the pole when it is first set as well as being applied to the pole after the latter shows signs of weakness.

The reenforcing means embodying the invention comprise two reenforcing plates or members of special design which are adapted to be set in the earth on opposite sides of the pole so that said plates embrace the portions of the pole both above and below the surface of the earth. The upper or exposed ends of the members are firmly clamped to the pole and they are of such a shape that the portions thereof which are embedded in the earth afford a firm anchorage.

The reenforcing members are constructed so that they can be readily driven into the earth on opposite sides of the pole provided, of course, the earth is of a character to permit of this operation. If it is not feasible to drive the reenforcing members into the earth then the earth may be dug out around the pole and the members placed in position after which the earth may be tamped about the members and pole.

In order to give an understanding of the invention I have illustrated herein some selected embodiments thereof which will now be described after which the novel features will be pointed out in the appended claims.

Fig. 1 is a view illustrating my improved reenforcing means in use for reenforcing a pole;

Fig. 2 is a section on the line 2—2, Fig. 1;

Fig. 3 is a perspective view of one of the reenforcing means;

In the drawings 1 indicates a wooden pole such as is used for telephone, telegraph or other transmission purposes, said pole being set in the earth 2. The pole is illustrated as being weakened by decay at the surface of the earth as shown at 3.

The reenforcing means I have provided for reenforcing a pole which has thus become weakened is of the type which comprises two reenforcing members adapted to be driven or set into the earth on opposite sides of the pole and then clamped to the pole, said reenforcing members being of a special shape which makes them extremely efficient in use. The two reenforcing members are indicated at 4 and these may be of any desired length. Each member is formed with a concave inner face 5 adapted to fit the pole and said face is provided with longitudinally-extending ribs 6 which become embedded in the pole and thus form an interlocking connection between the pole and the members. Each member is also formed on each longitudinal edge with a side wing 7 and is formed on its exterior face with a longitudinally-extending anchoring rib 8. The outer face of each member presents the two convexly curved portions 9 extending from the wings 7 to the central rib 8.

In many locations it will be possible to set the reenforcing plates 4 by simply driving them into the earth along side of the pole. These members will preferably be of such a length that when set they will extend to the bottom of the pole and will also extend above the surface of the earth for two to four feet. In order to facilitate the driving of the reenforcing members into the earth the lower edges thereof will preferably be bevelled as shown at 10. In case the character of the soil is such that it is not possible or feasible to drive the reenforcing members into the earth then they may be installed by digging the earth away around the poles and then setting the reenforcing members in position after which the earth will be replaced and tamped about the members and pole.

After the reenforcing members have been set the portions thereof above the ground are clamped firmly to the pole by means of clamping rods connecting the wings 7. In Figs. 1 and 2 these clamping rods are indicated at 11 and they connect a wing 7 of one member to a wing of the other member, said clamping rods extending through apertures 18 in the wings and being provided with clamping nuts 12 by which the reenforcing members may be clamped tightly to the pole. During the driving of the reenforcing members and also during the clamping operation the ribs 6 will become embedded in the surface of the pole thus interlocking the pole to the reenforcing members so that there can be no relative turning movement between the pole and reenforcing members.

The shape of the reenforcing members is specially adapted to afford a firm anchorage in the earth. When said members are driven into the earth the latter will be compacted firmly against the outside faces 13 of the wings 7 and will be further compacted firmly in the groove portions 9 between the wings and the central rib 8. This will make a firm anchorage in the earth which will prevent the reenforcing members 4 from turning and partly because of this and partly because of the interlocking connection between the pole and the reenforcing members, a pole reenforced with the reenforcing members herein shown will be even more firmly held in the earth than a new pole which has just been set.

The groove portions 9 make an exceptionally good anchorage for dirt or stones which are tamped around the plates after they are set so that when said reenforcing members are installed by first digging the earth around the pole and then setting the reenforcing members in position and afterwards filling in earth around said reenforcing members, the tamping of the earth during the filling process will tamp the earth firmly into the grooves 9 thus giving the plates a firm support in the earth. The concave shapes of the surfaces 9 afford a much better anchorage for the earth than the convex surface of a pole.

My invention has the advantage that the reenforcing members can be inexpensively made and can be readily set in position, the latter operation involving merely driving the members into the earth on opposite sides of the pole and then installing the clamping rods.

I claim:

A reenforcement for wooden poles comprising two reenforcing members adapted to be set into the earth at opposite sides of a pole, each member having a concave face to fit the pole and ribs extending longitudinally of said face, said ribs becoming embedded into the pole and affording an interlocking connection between the pole and the members, each member having at each edge a longitudinally-extending wing provided with apertures and also having on its exterior face a longitudinally-extending anchoring rib, the portion of the exterior face between each wing and the rib being convexly curved in a transverse direction and tie rods extending through the apertures of the wing and by which the members are clamped to the pole.

In testimony whereof, I have signed my name to this specification.

GEORGE B. SPRING.